DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 21, 1972

896 O.G. 833

T896,042
DURABLE PRESS CATALYST SYSTEM
Richard N. Knowles, P.O. Box 302, R.D. 1, Millcreek Road, Hockessin, Del. 19707
Filed Mar. 1, 1971, Ser. No. 119,818
Int. Cl. D06m *9/00*
U.S. Cl. 8—115.7
No Drawing. 14 Pages Specification

An improved catalyst system for reacting durable press resins with fabrics containing both cellulosic and non-cellulosic fibers consisting of zinc hydroxyacetate or a mixture of hydroxyacetic acid with magnesium chloride, zinc chloride or zinc nitrate, adjusted to a pH of 4.5 to 6.0. This catalyst system used in the conventional pad-dry-cure process imparts adequate durable press qualities with less impairment of the tensile strength and abrasion resistance of the fabric than conventional catalyst systems.